United States Patent Office

3,282,871
Patented Nov. 1, 1966

3,282,871
LIGNIN REINFORCED RUBBER USING COMBINA-
TION OF HIGH AND LOW MELTING LIGNINS
Mitchell S. Dimitri, Charleston, S.C., assignor to West
Virginia Pulp and Paper Company, New York, N.Y., a
corporation of Delaware
No Drawing. Filed July 19, 1963, Ser. No. 296,399
5 Claims. (Cl. 260—17.5)

This invention relates to lignin reinforced rubber compositions.

The procedures employed in the manufacture of tire treads require that the rubber stock employed in such use be capable of being extruded. The capacity of a rubber stock to be extruded is generally referred to as its "processability." Stocks which have good extrusion characteristics have good or high processability while stocks having poor extrusion characteristics have poor or low processability.

Most raw rubber stocks, carbon black masterbatches, and lignin masterbatches have poor processability characteristics due to their inherent high viscosity and hardness. These stocks are consequently subjected to a break down operation prior to extrusion. During this operation, which is customarily carried out today in equipment such as the Banbury, the rubber stock is masticated by the action of high speed rotors. As a result of the work involved in mastication, a considerable increase in the temperature of the stock occurs, with the temperature in such mastication mills running from about 300 to 450° F.

These high temperatures attained in the Banbury have a very adverse effect on the reinforcement qualities of non-modified lignins. The very small particles of non-modified lignin in a coprecipitate, melt and fuse together into much larger particles. Such larger particles do not provide the necessary reinforcement required for tread stocks and are consequently wholly unsatisfactory.

The ability of lignin to withstand the high temperature of Banbury treatment can be easily obtained by modification of the lignin in a number of ways. The lignin for example can be oxidized, reacted with formaldehyde or a phenolic resin, or coprecipitated with a polyvalent metal salt.

The use of these modified lignins which are capable of being masticated at the high temperature on the Banbury without undergoing fusion, however, is attended with certain disadvantages. During the process of coprecipitating lignin and rubber a slurry of lignin and rubber particles are obtained which necesssarily must be separated from the supernatant liquid and dried before further processing operations can be conducted. The modified lignins which are resistant to high temperature fusion all possess a much higher affinity for water. This results in a significant increase in the quantity of water retained by the lignin upon coprecipitation. This increase in retained water in turn results in greatly reduced filtration rates, filter cake solids, and drying rates which in sum greatly increase the cost of processing the lignin-rubber coprecipitate.

The water retention of the lignin in the coprecipitate can be significantly reduced by heating the slurry before filtration. Such heating, however, must be very carefully conducted within relatively narrow temperature ranges if the full strength properties in the rubber are to be obtained. Operation outside of this narrow temperature range, which is different for the specific modified lignin, results in significant decreases in physical properties of the final dried rubber stock. The temperature of heating varies widely in accordance with the wide variation possible in the degree of modification of the lignin. With limited modification to the lignin, temperatures as low as 175° F. can be employed to obtain optimim results. Such limited modification to the lignin, however, does not permit the lignin to withstand the high temperatures in the Banbury without fusion. More highly modified lignins, consequently, are needed. Such modified lignins which will process satisfactorily in the Banbury require a heat treatment in the slurry stage of 210° F. or higher. In addition, these highly modified lignins impart much higher hardness and viscosity to the rubber stock resulting in much poorer extrusion characteristics. This poorer processability of the more highly modified lignins, even after extensive mastication in the Banbury, greatly impairs their use in the making of tire treads.

Because of the nature of lignins in rubber, the problem which is encountered is that in order to provide a lignin which is capable of being processed in the Banbury without undergoing fusion it is necessary to employ a modified lignin which greatly decreases the processability of the rubber stock thereby greatly nullifying the purpose of the Banbury treatment.

It is, consequently, the primary object of the present invention to provide a lignin re-inforcing agent which can be subejected to high temperature mastication above 300° F. without causing a severe loss in physical properties through extensive fusion of the individual particles and which does not seriously decrease the processability characteristics of the stock. Other objects of this invention will become obvious from the following disclosure.

I have found that by using a combination of a modified lignin having a high fusion point with a lignin having a much lower fusion point that the re-inforced rubber stock can be subjected to high temperature break down without suffering a serious decrease in physical properties while retaining satisfactory processability characteristics.

As lignins tend to sinter or fuse, it is extremely difficult to make accurate determination of their melting points. The melting points of lignins, however, have been found to be inversely proportional to the solubility of the lignins in acetone. As the solubility of lignin in acetone can be simply and accurately determined, and such solubility information gives a direct indication of the melting, or fusing characteristics of the lignin, acetone solubility will be employed herein to deflne the types of lignin involved rather than the melting point.

In determining acetone solubility, ten grams of lignin are slurried in 100 ml. of acetone and the slurry agitated at 70° F. for five minutes. The slurry is then centrifuged and the supernatant fluid decanted. The remaining solids are reslurried in 100 ml. of acetone and the process repeated until a clear supernatant liquid is obtained. The solids are dried at 105° C. and weighed to determine the acetone insoluble fraction from which the percent soluble can be easily calculated.

It should be noted that determination of the acetone solubility must be made employing the lignin in the same form as that in which the lignin will exist in the rubber stock. In all cases, the acetone solubility will therefore be determined using a water insoluble, precipitated lignin. With the exception of the polyvalent metallic salts, the lignin will be in the insoluble free acid form.

In the practice of this invention, I employ a mixture of two types of lignin having widely diverse melting points. This mixture contains about 40 to 90% of a modified lignin having a high melting point and an acetone solubility of less than 30% and from 60 to 10% of a low melting lignin having an acetone solubility of more than 50%.

The high melting lignin can be simply and inexpensively prepared in a number of ways; by oxidation, by reaction with phenolic resin, by formation of insoluble polyvalent metallic salts, or by heating the lignin in alkaline solutions of sulfides. The oxidized lignins may most easily be prepared by flowing air or any oxygen containing gas through an aqueous alkaline solution of the lignin preferably at elevated temperatures. Alternatively, the lignin may be oxidized by contacting dry lignin particles with hot air or oxygen containing materials or by the use of chemical oxidizing agents such as hydrogen peroxide, periodates, hypochlorides, ozone, etc. These methods of oxidizing lignin are all old and have been previously described in prior references such as U.S. Patent 2,610,954.

The formaldehyde reacted lignins may be prepared by heating an aqueous alkaline solution of lignin with formaldehyde. Up to about 2.4 moles of formaldehyde can be reacted per 1000 unit weight of lignin. The higher the quantity of formaldehyde reacted with the lignin the greater will be the cross linking of the lignin molecules with the consequent greater increase in the melting point of the product.

The phenolic resin modified lignins may be prepared by reaction of the lignin with an alkaline catalyzed phenolic resin which is in the A stage. The resin, which is generally referred to as a resole and is chemically a mixture of methylolated phenols, reacts readily with the lignin to produce products of greatly increased melting points. Generally only about 5 to 100 parts of the resole are required per 1000 parts of lignin to achieve the desired increase in melting point. It is generally preferred that the lignin be heated in an aqueous alkaline solution with the resole to achieve complete reaction, however, the reactivity of these materials is such that sufficient reaction can be obtained by the acidification of an aqueous alkaline lignin and resole solution during coprecipitation with the rubber.

The polyvalent metallic salts of lignin have an extremely high melting point and are conveniently prepared by the use of any water soluble polyvalent metallic salt in the coprecipitation of the lignin and rubber.

The method of preparing sulfide reacted lignins is best shown in U.S. Patent 2,816,832 to Cisney et al., and Re. 24,293 to Hagglund.

The low melting lignins having an acetone solubility greater than 50% will include the many various types of lignins as they are recovered from the digesting medium such as soda or kraft pulping liquor. Employing the customary recovery procedures of precipitating these lignins from the liquor with an acid, the low melting lignins will be obtained.

The incorporation of the mixture of high and low melting lignins into the rubber stock can most simply be accomplished by dissolving both the lignins together in an alkaline solution. The resultant solution is mixed with the rubber latex and acidified in accordance with the customary procedures to coprecipitate the lignins and the rubber together.

In the cases where polyvalent metallic lignin salts or phenolic resin modified lignin are employed the same simple procedures can not be employed. As the polyvalent metallic lignin salts are formed upon addition of the metal salt to a lignin solution, in order to obtain a mixture of different melting lignins, it is necessary to precipitate the polyvalent metallic lignin salt separately from the low melting lignin. For example, the polyvalent metal salt can be added to a mixture of latex and an aqueous lignin solution, such addition will cause the precipitation of the lignin in the polyvalent metal salt form and coagulation of the latex. When the polyvalent metal salt has been exhausted additional lignin in an aqueous alkaline solution may be added to the mixture and precipitated with acid. This procedure may be reversed with the first portion of the lignin being coprecipitated with acid followed by the addition of more lignin which is precipitated by the addition of a metallic salt.

Employing phenolic resin modified lignins it is necessary that the low melting lignin be precipitated with no unreacted resole present. Where the phenolic resin modified lignin has been prepared by heating the materials together until all the resole has reacted with the lignin, the phenolic resin modified lignins can be dissolved together with a non-reacted low melting lignin and coprecipitated with the latex in the normal manner. However, where the lignin is merely dissolved together with the resole and the reaction permitted to take place during and after coprecipitation, such coprecipitation with the resole must be accomplished separately from the coprecipitation of the low melting lignin to avoid any reaction of the resole with the low melting lignin which would increase its melting point, destroying its value in the present invention.

In preparing lignin-rubber coprecipitate masterbatches it is generally desirable to employ a heat treating process on the lignin-rubber coprecipitate particles while they are still in the slurry. The purpose of this heat treatment is to greatly improve the filtering characteristics, raise the solids content, and increase the drying rate of the lignin-rubber particles. Employing high melting highly modified lignins the temperature required for heat treating the slurry has been found to range from about 175 to 270° F. The exact temperature for heat treatment is dependent upon the specific lignin being used and it is quite critical to employ a temperature within a narrow range to obtain the desired improvement in filtration solids and drying without destroying the reinforcement properties, of the lignin particles through fusion. For example, a specific formaldehyde modified lignin may require heating to 195–210 to accomplish the desired results. As highly oxidized lignin may require a temperature of 230–240 and a polyvalent lignin salt may require a temperature of 270–280° F.

The normal non-modified low melting lignins if heated to temperatures above about 175° while still in slurried form will fuse and agglomerate. However, it has been found that these low melting lignins when employed in combination with the high melting lignins according to this invention may be heated to temperatures well above that at which they would by themselves fuse and agglomerate. Additionally, it has been found that this combination of low and high melting lignins permits the use of much lower temperautres than would be necessary to dehydrate the high melting by themselves. These very surprising results as to heating of the coprecipitate slurry froms a very valuable feature of this invention.

While the present invention has particular utility in use with butadiene styrene and natural rubber which are employed in making tire treads it may also be advantageously employed with other butadiene type rubbers, such as, butadiene acrylonitrile and chlorobutadiene rubbers, to improve the molding or extrusion characteristics of lignin reinforced stocks. This invention is particularly adapted for use with so called oil extended rubbers such as are described and disclosed in U.S. Patent 2,964,083 which are currently being employed almost exclusively in making automobile treads.

Between about 25 and 100 parts by weight of lignin per 100 parts of rubber, exclusive of additives or extender, such as oil, may be employed according to this invention. Below about 5 parts there is little need to employ the mixture of lignins of this invention due to the relatively small effect of the low loading on processability.

*Example 1*

An oxidized lignin of high melting point was prepared by blowing air through a 10% solids aqueous alkaline solution of a kraft pine lignin for 24 hours at ambient temperatures. By this treatment the acetone solubility was reduced from 65% to 5%. 51.6 parts of this oxidized lignin and 17.2 parts of an unmodified kraft pine lignin having an acetone solubility of 58.8% were dissolved in an aqueous alkaline solution and the resultant solution mixed with a butadiene styrene rubber latex type 1712 containing 100 parts by weight of rubber solids. 37.5 parts of aromatic oil (Sundex 53) were added to the lignin and rubber and the entire mixture coprecipitated by the addition of a dilute solution of sulfuric acid which reduced the pH of the liquid to 2.15. The slurry of coprecipitated particles were heated to 210° F. to agglomerate the lignin rubber particles. The supernatant liquid was removed by filtration and the coprecipitate dried. This coprecipitate was labeled B.

The above process was also employed to make lignin rubber coprecipitate wherein the lignin was composed entirely of the oxidized lignin, of 60% oxidized and 40% non-modified lignin, and entirely of non-modified lignin. These coprecipitates were labeled A, C, and D, respectively.

All four samples were broken down in a Banbury for 5 minutes with maximum temperatures of from 395 to 401° F, compounded, cured, and tested. The following table illustrates the results of these tests.

|  | Sample No. | | | |
|---|---|---|---|---|
|  | A | B | C | D |
|  | 100% Oxidized | 75% Oxidized, 25% non-modified | 60% Oxidized, 40% non-modified | 100% non-modified lignin |
| Tensile strength, p.s.i. | 2,620 | 2,940 | 2,690 | 890 |
| Hardness, Shore A | 64 | 61 | 54 | 65 |
| Viscosity, Productive Mooney | 83 | 62 | 56 |  |
| Processability | (¹) | (²) | (³) |  |

¹ Extremely poor.
² Good.
³ Excellent.

Thus the use of the combination of the high and low melting lignin gave much better processability and a softer rubber without sacrifice in strength properties. While the use of the non-modified lignin by itself had wholly unsatisfactory properties.

*Example 2*

The general procedures employed in Example 1 were followed in producing a series of rubber samples containing a formaldehyde reacted lignin as the high melting component. The formaldehyde reacted lignin was prepared by dissolving 100 parts of lignin in 86.2 parts of aqueous alkaline solution, and heating the resultant solution for 180 minutes at 210° F. The acetone solubility of the formaldehyde reacted lignin was about 0.5%.

In this series of runs the percentage of formaldehyde modified lignin was varied from 100 to 50% and the non-modified lignin from 0 to 50%.

The following table presents the tests results obtained on these samples.

| | | | | | | |
|---|---|---|---|---|---|---|
| Percent formaldehyde modified lignin | 100 | 90 | 80 | 70 | 60 | 50 |
| Percent non-modified lignin | 0 | 10 | 20 | 30 | 40 | 50 |
| Tensile strength | 2,930 | 3,280 | 3,100 | 2,850 | 2,910 | 2,340 |
| Productive Mooney | 68 | 51 | 45 | 47 | 47 | 43 |
| Hardness | 65 | 56 | 54 | 58 | 53 | 54 |
| Processability rating | (¹) | (²) | (³) | (³) | (³) | (³) |

¹ Poor.
² Good.
³ Excellent.

I claim:
1. A lignin-rubber coprecipitate comprising 100 parts by weight of a butadiene type rubber and from about 25 to 100 parts by weight of lignin, the lignin in said coprecipitate being composed of about 10 to 60% of a lignin having an acetone solubility greater than 50% and from about 90 to 40% of a lignin having an acetone solubility less than 30%.

2. The rubber stock of claim 1 which contains from about 10 to 50 parts of a rubber extending oil.

3. The rubber stock of claim 1 wherein the high melting lignin having an acetone solubility of less than 30% is a lignin reacted with from 1.0 to 2.5 moles of formaldehyde.

4. The rubber stock of claim 1 wherein the high melting lignin having an acetone solubility of less than 30% is an oxidized lignin.

5. The method which comprises preparing an aqueous alkaline mixture containing 100 parts by weight of a butadiene type rubber latex and from 25 to 100 parts by weight of lignin, said lignin being composed of from 10 to 60% by weight of a low melting lignin having an acetone solubility greater than 50% and from 90 to 40% by weight of a high melting lignin having an acetone solubility of less than 30%, coprecipitating said lignin and latex from said aqueous mixture, subjecting the lignin-rubber mixture after drying to mastication at a temperature between 300 and 450° F., and compounding and curing said lignin-rubber mixture.

References Cited by the Examiner
UNITED STATES PATENTS

| 2,857,345 | 10/1958 | Griffith et al. | 260—17.5 |
| 2,964,083 | 12/1960 | Pfau et al. | 260—17.5 |
| 3,167,523 | 1/1965 | Dimitri | 260—17.5 |

WILLIAM H. SHORT, *Primary Examiner.*

J. J. NORRIS, *Assistant Examiner.*

UNITED STATES PATENT OFFICE
CERTIFICATE OF CORRECTION

Patent No. 3,282,871

November 1, 1966

Mitchell S. Dimitri

It is hereby certified that error appears in the above numbered patent requiring correction and that the said Letters Patent should read as corrected below.

Columns 5 and 6, table at the top of columns, second column, line 3, for "2,930" read -- 2,920 --.

Signed and sealed this 22nd day of August 1967.

(SEAL)
Attest:

ERNEST W. SWIDER
Attesting Officer

EDWARD J. BRENNER
Commissioner of Patents